Aug. 13, 1968     R. J. RIES     3,396,488

UNITARY PLANTER WITH BOTTOM FLANGE

Filed Aug. 22, 1966

*INVENTOR.*
RAYMOND J. RIES

BY Knox & Knox

United States Patent Office 3,396,488
Patented Aug. 13, 1968

3,396,488
UNITARY PLANTER WITH BOTTOM FLANGE
Raymond J. Ries, 720 4th Ave., Room 271,
San Diego, Calif. 92101
Filed Aug. 22, 1966, Ser. No. 573,896
1 Claim. (Cl. 47—33)

ABSTRACT OF THE DISCLOSURE

A planter of endless form, either multiple sided or circular, with spaced vertical inner and outer walls joined by flat top and bottom walls to define a hollow structure filled with static reinforcing material for rigidity. The planter is held in position by the soil placed therein in use and bearing on an inwardly extending anchoring flange unitary with and coextensive with the lower edge of the inner vertical wall and dimensioned to define a relatively larger opening in the bottom of the planter whereby roots of plantings can reach the soil beneath.

---

The present invention relates to landscaping and specifically to a unitary planter with a bottom flange, which assures the planter being held securely in place by the soil contained therein.

In landscaping or garden layouts many different types and arrangements of planters are used in the form of borders or low walls around plants or certain areas of the layout. Most planters are made from concrete, brick, stone, wood, or even metal and require a somewhat permanent footing, or they must be embedded securely in the soil. Such arrangements are not readily altered to suit changes in planting and the initial labor and cost involved in installing the planters is often considerable.

The planter described herein is a light weight unitary structure which can be placed directly on the surface of the ground, or in a very shallow recess if desired, around a plant or group of plantings, or to enclose a specific area of ground.

Inside the planter is an integral bottom flange which is covered by soil placed in the planter; much of the weight of the soil presses downwardly on the flange 14, holding the planter firmly against being inadvertently raised or tilted out of place. Since no footings or permanent installations are necessary, it is a simple matter to move or rearrange planters to suit changes in plantings, or for periodic changes in the landscaping. The planter is low in cost and can be made in a variety of shapes for specific purposes. By using planters of various shapes and sizes it is possible to lay out a miniature garden, with small planters arranged inside larger ones if desired.

The basic planter and its use, together with several examples of useful shapes, are illustrated in the drawing, in which.

Similar characters of reference indicate similar or identical elements and portions throughout the specification and throughout the views of the drawing.

Figure 1:
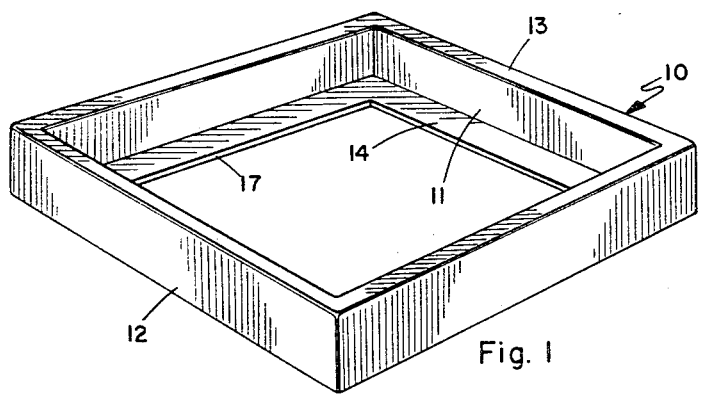
FIGURE 1 is a perspective view of a basic form of the planter.

The basic planter shown in FIGURE 1, is rectangular or square in planform and is bounded by a double wall 10 comprising a vertical inner wall 11 and an outer wall 12 united by a flat top wall 13, the same reference numeral being used to designate the top walls of other configurations in FIGURES 3–6. A peripheral anchoring flange 14 forms the bottom of the double wall 10 and extends inwardly of the planter from the lower edge of the inner wall 11, to which it is preferably secured. The reference numeral 14 is used to designate the corresponding flange in planters of other configurations illustrated in FIGURES 3–6. The planter can be made from a variety of materials but is preferably made of plastic for resistance to moisture, chemicals in the soil, insects and damage due to handling or impact. In order to minimize weight and cost while retaining sufficient body and rigidity, the double wall 10 is hollow and may be reinforced by a filling of plastic foam or similar material 16. The plastic of the walls 11, 12 and 13 may be opaque but it is conceived as transparent or translucent, and the filling 16 is colored to suit individual tastes and uses. The relatively large opening 17 defined by the anchoring flange 14 allow the roots of plants to reach the soil under the planter as indicated in FIGURE 2.

Figure 2:
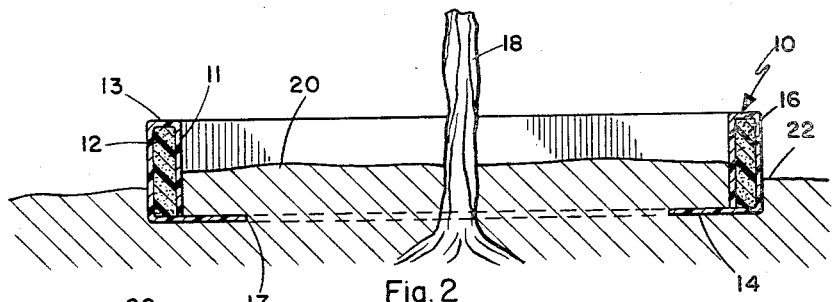
FIGURE 2 is an enlarged transverse sectional view showing the use of the planter.
Figure 4:
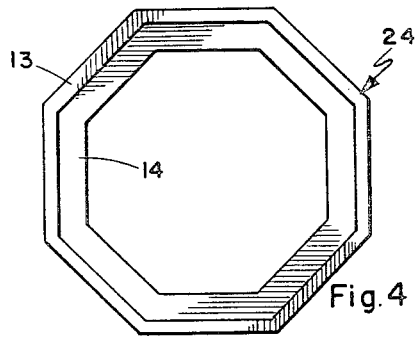
FIGURES 4, 5 and 6 are top plan views of other planter configurations.

In use the planter may be placed around an existing plant 18, as in FIGURE 2, or positioned to enclose a selected area for planting. The interior of the planter is then filled with soil 20, or partially filled to the desired depth, the weight of the soil on flange 14 holding the unit firmly in place. The planter can be placed directly on the surface of the ground or in a very shallow recess, the exterior soil being collected around the outside of the planter, as at 22, to conceal the lower edge of the wall and further secure the unit. Many different configurations of planters may be made using the same basic wall 10 and flange 14 structure. One example is shown in FIGURE 4, in which the planter 24 is octagonal in planform. Others could be hexagonal, triangular, circular, or even irregular in shape.

Figure 5:
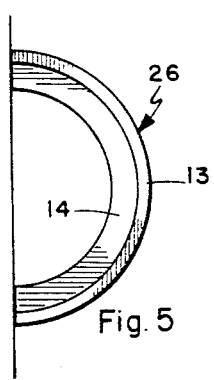
Figure 6:
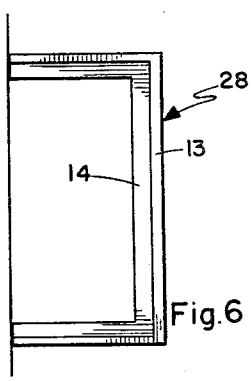

To enclose plants or selected areas adjacent a wall or other structure the planter is open sided, such as the semi-circular unit 26 in FIGURE 5, or the rectangular U-shaped unit 28 in FIGURE 6.

Figure 3:
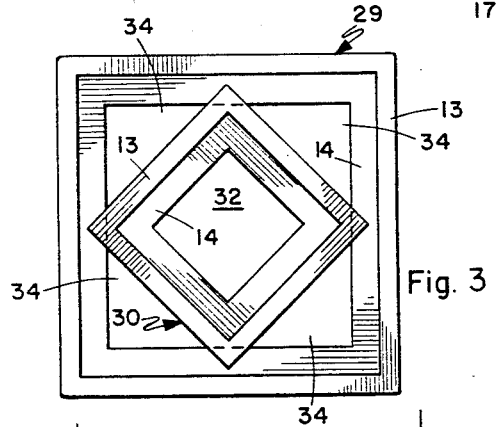
FIGURE 3 is a top plan view showing the combination of two planters of different sizes.

Planters of different sizes can be combined, as in FIGURE 3, wherein a square planter 29 has a smaller square planter 30 inside and rotated 45 degrees. This provides a square central area 32 and four triangular areas 34 which can be utilized for individual planting or decoration. Many other combinations will be obvious and it is possible to assemble a complete miniature garden if desired.

Since no permanent footings or installations are required, the planters are easily removed or rearranged as necessary, yet will not be displaced by normal use of lawn mowers or the like in the maintenance of the plantings or decorative arrangements. In addition the plastic material may be colored for decorative effect and the inner, outer and top walls are easily made transparent or translucent with variously colored plastic foam fillings 16 to reinforce or contrast with colors of flowers or other plantings chosen for the individual planters.

It is understood that minor variation from the form of the invention disclosed herein may be made without departure from the spirit and scope of the invention, and that the specification and drawing are to be considered as merely illustrative rather than limiting.

I claim:
1. A planter for placement on the soil, comprising:
   a unitary, endless, substantially upright bounding wall, said wall being imperforate and double and comprising an inner vertical wall, an outer vertical wall, a flat top wall and a bottom wall;
   an inwardly extending anchoring flange integral and coextensive with the lower edge of said inner vertical wall and dimensioned to define a relatively large opening in the bottom of the planter, whereby soil placed in the planter presses downwardly on said anchoring flange and holds the planter against being raised or tilted, and whereby roots of plantings can reach the soil beneath;

and said double wall being filled with static reinforcing material.

References Cited

UNITED STATES PATENTS

| | | | |
|---|---|---|---|
| 397,732 | 2/1889 | Landis | 47—33 |
| 2,782,561 | 2/1957 | Smith | 47—25 |
| 2,909,328 | 10/1959 | Babyak. | |
| 3,315,752 | 4/1967 | Pasquini | 47—33 |

ROBERT E. BAGWILL, *Primary Examiner.*